(12) United States Patent
Jiao et al.

(10) Patent No.: US 12,460,990 B2
(45) Date of Patent: Nov. 4, 2025

(54) DEVICE FOR REAL-TIME MONITORING AND EARLY WARNING OF BRIDGE BASED ON FOLDABLE TRIBOELECTRIC NANOGENERATORS

(71) Applicant: ZHEJIANG UNIVERSITY, Zhejiang (CN)

(72) Inventors: Pengcheng Jiao, Hangzhou (CN); Hao Zhang, Hangzhou (CN); Wentao Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 300 days.

(21) Appl. No.: 18/184,643

(22) Filed: Mar. 15, 2023

(65) Prior Publication Data

US 2023/0296471 A1    Sep. 21, 2023

(30) Foreign Application Priority Data

Mar. 17, 2022    (CN) .......................... 202210265144.4

(51) Int. Cl.
*G01M 7/02* (2006.01)
*G01M 5/00* (2006.01)
(Continued)

(52) U.S. Cl.
CPC .......... *G01M 7/025* (2013.01); *G01M 5/0008* (2013.01); *G01M 5/0066* (2013.01);
(Continued)

(58) Field of Classification Search
CPC ...... G01M 5/0008; G01M 7/025; G01M 7/06; G01M 5/0066; Y02A 30/30; H02N 1/04
(Continued)

(56) References Cited

U.S. PATENT DOCUMENTS

| | | | |
|---|---|---|---|
| 11,428,075 B2 * | 8/2022 | Gooneratne | ............ E21B 47/26 |
| 2018/0355840 A1 * | 12/2018 | Hsu | .......................... F03D 5/00 |

(Continued)

FOREIGN PATENT DOCUMENTS

| | | |
|---|---|---|
| CN | 103780121 A | 5/2014 |
| CN | 106787930 A | 5/2017 |

(Continued)

OTHER PUBLICATIONS

Translation CN108802426 (Year: 2017).*
(Continued)

*Primary Examiner* — Peter J Macchiarolo
*Assistant Examiner* — Monica S Young
(74) *Attorney, Agent, or Firm* — Wiersch Law Group

(57) ABSTRACT

A device for real-time monitoring and early warning a bridge based on foldable triboelectric nanogenerators, comprising a signal generator, a data acquisition and transmission module, and a data processing and early warning module sequentially connected. The signal generator comprises an internal unit and an external unit, and the external unit comprises a lower sleeve, a device sidewall and a lower magnet; the lower magnet is fixed at the bottom of the lower sleeve; the internal unit comprises a cover plate, an upper magnet, an upper sleeve and a flexible multilayer triboelectric nanogenerators; the flexible multilayer triboelectric nanogenerators is inserted into the gap between the lower sleeve and the device sidewall; the cover plate is located at the upper end of the flexible multilayer triboelectric nanogenerators; the upper sleeve is inserted into the lower sleeve; and the upper magnet is fixedly provided at the bottom of the upper sleeve.

5 Claims, 3 Drawing Sheets

(51) Int. Cl.
*G01M 7/06* (2006.01)
*H02N 1/04* (2006.01)

(52) U.S. Cl.
CPC ............... *G01M 7/06* (2013.01); *H02N 1/04* (2013.01); *Y02A 30/30* (2018.01)

(58) Field of Classification Search
USPC ........................................................ 73/658
See application file for complete search history.

(56) References Cited

U.S. PATENT DOCUMENTS

| | | | |
|---|---|---|---|
| 2019/0360859 | A1 | 11/2019 | Lai et al. |
| 2021/0404139 | A1 | 12/2021 | Guo et al. |
| 2022/0407401 | A1* | 12/2022 | Parida ............... H02K 35/02 |

FOREIGN PATENT DOCUMENTS

| | | | | |
|---|---|---|---|---|
| CN | 206161147 | U | | 5/2017 |
| CN | 107121253 | A | | 9/2017 |
| CN | 107508488 | A | | 12/2017 |
| CN | 108092542 | A | * | 5/2018 |
| CN | 108802426 | A | * | 11/2018 ............ G01B 21/02 |
| CN | 111103052 | A | | 5/2020 |
| CN | 210529516 | U | | 5/2020 |
| CN | 111884537 | A | * | 11/2020 ............... H02J 7/32 |
| CN | 111885192 | A | | 11/2020 |
| CN | 112729091 | A | | 4/2021 |
| CN | 113285630 | A | * | 8/2021 ............ G01H 17/00 |
| CN | 113507232 | A | | 10/2021 |
| CN | 113556060 | A | * | 10/2021 |
| CN | 113872463 | A | | 12/2021 |
| CN | 113984110 | A | | 1/2022 |
| CN | 118224039 | A | * | 6/2024 |
| JP | 2008014693 | A | | 1/2008 |
| WO | 2018223474 | A1 | | 12/2018 |
| WO | WO-2021167532 | A1 | * | 8/2021 ............ H02K 35/02 |

OTHER PUBLICATIONS

Translation_CN113556060 (Year: 2021).*
Translation_CN113285630 (Year: 2021).*
CN First Office Action(CN202210265144.4); Date of Mailing: Nov. 18, 2022.
Notice Of Allowance(CN202210265144.4); Date of Mailing: May 30, 2023.
Research-on-BIM-based-bridge-maintenance-monitoring(Mechanical translation).
Pagoda-Shaped-Triboelectric-Nanogenerator-With-High-Reliability-for-Harvesting-Vibration-Energy-and-Measuring-Vibration-Frequency-in-Downhole.

* cited by examiner

DEVICE FOR REAL-TIME MONITORING AND EARLY WARNING OF BRIDGE BASED ON FOLDABLE TRIBOELECTRIC NANOGENERATORS

CROSS-REFERENCE TO RELATED APPLICATIONS

The present application claims priority to Chinese Patent Application No. 202210265144.4, filed on Mar. 17, 2022, the content of which is incorporated herein by reference in its entirety.

TECHNICAL FIELD

The present disclosure relates to the technical field of intelligent monitoring and in particular to a device for real-time monitoring and early warning of a bridge based on foldable triboelectric nanogenerators.

BACKGROUND

With the continuous development and innovation of long-span bridge design and construction technologies, stayed-cable-bridges and suspension bridges are widely used in long-span bridges, in particular bay bridges. The stay cable and the suspension cable are used as important components bearing bridge stress, and are prone to abnormal vibration caused by environmental corrosion, vehicle load fatigue, wind vibration and the like. Therefore, vibration monitoring of stay cables and suspension cables has become the focus of attention. At present, a traditional monitoring device is mainly composed of accelerometers, anemometers and other equipment, which is restricted by factors such as high maintenance cost. They cannot realize multi-direction vibration monitoring and cannot guarantee sensitivity and real-time performance. As the above problems of the traditional vibration monitoring device have become more and more serious, it is necessary to design a device for real-time monitoring and early warning of the bridge vibration that meets the requirements of the era.

The development of triboelectric nanogenerators and wireless sensor technology provides technical support for the present disclosure. Triboelectric nanogenerators can convert micro mechanical energy into electrical energy by coupling triboelectric effect with electrostatic induction effect. Triboelectric nanogenerators have the characteristics of small size, high efficiency energy capture in low frequency state, and has been widely concerned by the engineering community. Wireless sensor technology includes data acquisition, wireless transmission, and data processing and early warning technology. Wireless transmission does not require wiring, so its layout is more flexible, seriously reducing the overall cost. As a new wireless transmission mode, narrowband internet of things has substantial advantages in transmission power consumption, transmission bandwidth, transmission power consumption and transmission distance, and has been the research focus in the field of wireless transmission.

SUMMARY

Regarding the problems that the traditional bridge vibration monitoring device is restricted by factors such as high maintenance costs, which cannot realize multi-direction vibration monitoring, and cannot guarantee sensitivity and real-time performance, the present disclosure provides a device for real-time monitoring and early warning of a bridge based on foldable triboelectric nanogenerators.

The purpose of the present disclosure can be accomplished by the following technical solutions: a device for real-time monitoring and early warning of a bridge based on foldable triboelectric nanogenerators, including a signal generator, a data acquisition and transmission module, and a data processing and early warning module. The signal generator, the data acquisition and transmission module, and the data processing and early warning module are sequentially connected.

The signal generator includes an internal unit and an external unit, and the internal unit is inserted into the external unit.

The external unit includes a lower sleeve, a device sidewall and a lower magnet. The lower sleeve is fixed in the device sidewall, and a number of vertical grooves are provided at the upper section of the lower sleeve. The lower magnet is fixed at the bottom of the lower sleeve.

The internal unit includes a cover plate, an upper magnet, an upper sleeve and a flexible multilayer triboelectric nanogenerators. The flexible multilayer triboelectric nanogenerators is inserted into the gap between the lower sleeve and the device sidewall. The cover plate is arranged at the upper end of the flexible multilayer triboelectric nanogenerators, and the upper sleeve is fixed at a middle position through a bracket. The bracket is matched with the groove of the upper section of the lower sleeve. The upper sleeve is inserted into the lower sleeve to form a sliding connection, and the upper magnet is fixed at the bottom of the upper sleeve.

Further, when the internal unit is subjected to axial vibration, the internal unit slides downwards along the axis through the cover plate to squeeze the flexible multilayer triboelectric nanogenerators, such that the upper surface and the lower surface of the flexible multilayer triboelectric nanogenerators with opposite polarities are subjected to contact separation motion to generating a voltage signal.

Further, when the axial vibration disappears, the repulsive force generated by the upper magnet and the lower magnet resets the internal unit.

Further, when the internal unit is subjected to radial vibration, the cover plate shakes left and right along the radial direction, such that the side wall of the flexible multilayer triboelectric nanogenerators and the device sidewall are subjected to contact separation motion due to the opposite material polarities to generate a voltage signal.

Further, the flexible multilayer triboelectric nanogenerators includes two materials with opposite polarity between the upper surface and the lower surface of the adjacent layers and between the side wall and the device sidewall, including a multilayer flexible structure that is elastic and extendible/foldable.

Further, the two materials used in the flexible multilayer triboelectric nanogenerators are copper and nylon, respectively. The flexible multilayer triboelectric nanogenerators is designed to be multilayer and extendible/foldable, and has the advantages of simple fabrication, high efficiency, and being suitable for multi-direction mechanical triggering.

Further, the data acquisition and transmission module include a data acquisition chip and a data transmission chip. The data acquisition chip is configured to collect the voltage signals generated by the flexible multilayer triboelectric nanogenerators in two different directions. The data transmission chip transmits the voltage signals collected by the data acquisition chip to the data processing and early warning module through a wireless and real-time transmission for analysis and early warning.

Further, the device further includes an energy supply module to supply power for the data acquisition chip and the data transmission chip to ensure the data acquisition chip and the data transmission chip to operate normally and stably.

Further, the data processing and early warning module receive the voltage signal transmitted by the data transmission chip in real time. The voltage signal has a magnitude positively correlated with the vibration amplitude of the bridge. When the voltage signal is higher than the preset voltage threshold, the data processing and early warning module determines that the bridge vibration is excessive, transmits the results to the relevant departments to avoid safety accidents.

The beneficial effects of the present disclosure are as follows. Considering the problems existing in the traditional vibration monitoring device, the present disclosure provides a device for real-time monitoring and early warning of a bridge based on foldable triboelectric nanogenerators, which can be used for the multi-direction vibration state monitoring of long-span bridges such as stayed-cable-bridges and suspension bridges. The traditional bridge vibration monitoring device is restricted by factors such as high maintenance cost, such that multi-direction vibration monitoring cannot be achieved and sensitivity and real-time performance cannot be guaranteed. The bridge real-time monitoring device according to the present disclosure includes a multilayer flexible triboelectric nanogenerators, which can simultaneously sensitively monitor the low frequency vibration of the bridge in the vertical direction under the vehicle load and the low frequency vibration in the horizontal direction under the influence of wind. The present disclosure adopts the narrowband internet of things wireless communication mode, and transmits the collected voltage signal to the data processing and early warning module in wireless real-time. The data processing and early warning module is configured to process, store and visualize the collected data in real time. When the voltage signal exceeds the preset voltage threshold, the monitoring device may determine that the bridge vibration is excessive, and early warning measures can be taken immediately.

Figure 1:
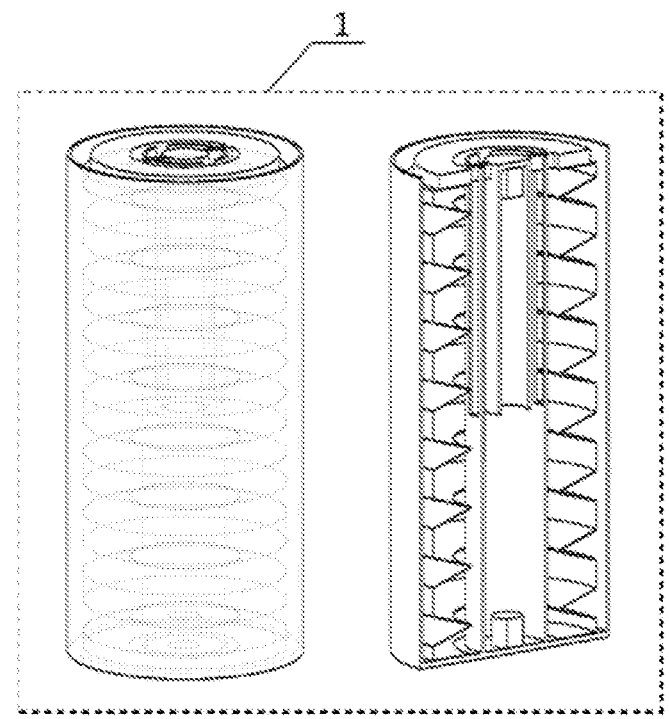
FIG. 1 is a schematic diagram of a device for real-time monitoring and early warning of a bridge based on foldable triboelectric nanogenerators.

Reference signs: signal generator 1, internal unit 2, cover plate 201, upper magnet 202, upper sleeve 203, flexible multilayer triboelectric nanogenerators 204, external unit 3, lower sleeve 301, device sidewall 302, lower magnet 303, data acquisition and transmission module 4, data acquisition chip 401, data transmission chip 402, energy supply module 5, and data processing and early warning module 6.

DESCRIPTION OF EMBODIMENTS

Figure 2:
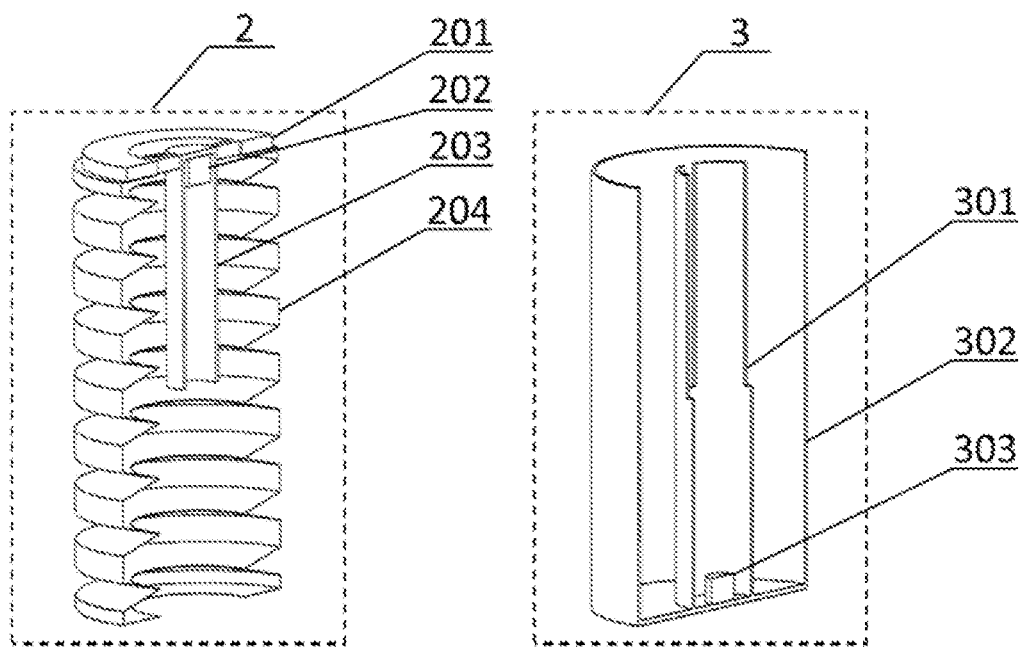
FIG. 2 is a schematic diagram of an upper structure and a lower structure of a device for real-time monitoring and early warning of a bridge based on foldable triboelectric nanogenerators.

As shown in FIGS. 1-2, the present disclosure provides a device for real-time monitoring and early warning of a bridge based on foldable triboelectric nanogenerators, including a signal generator 1, a data acquisition and transmission module 4 and data processing and early warning module 6 sequentially connected.

The signal generator 1 includes an internal unit 2 and an external unit 3, and the internal unit is inserted into the external unit.

The external unit 3 includes a lower sleeve 301, a device sidewall 302 and a lower magnet 303. The lower sleeve 301 is fixed in the device sidewall 302, and a number of vertical grooves are provided at the upper section of the lower sleeve 301. The lower magnet 303 is fixed at the bottom of the lower sleeve 301.

The internal unit 2 includes a cover plate 201, an upper magnet 202, an upper sleeve 203 and a flexible multilayer triboelectric nanogenerators 204. The flexible multilayer triboelectric nanogenerators 204 is inserted into the gap between the lower sleeve 301 and the device sidewall 302. The cover plate 201 is arranged at the upper end of the flexible multilayer triboelectric nanogenerators 204, and the upper sleeve 203 is fixed at the middle position through a bracket. The bracket is matched with the groove of the upper section of the lower sleeve 301. The upper sleeve 203 is inserted into the lower sleeve 301 to form a sliding connection, and the upper magnet 202 is fixed at the bottom of the upper sleeve 203.

The flexible multilayer triboelectric nanogenerators 204 is composed of two materials with opposite polarity between the upper surface and the lower surface of the adjacent layers and between the side wall and the device sidewall 302, including a multilayer flexible structure that is elastic and extendible/foldable. The two materials used in the flexible multilayer triboelectric nanogenerators 204 include copper and nylon, respectively. The flexible multilayer triboelectric nanogenerators 204 is designed to be multilayer and extendible/foldable, and has the advantages of simple fabrication, high efficiency, and being suitable for multi-direction mechanical triggering.

Figure 3:
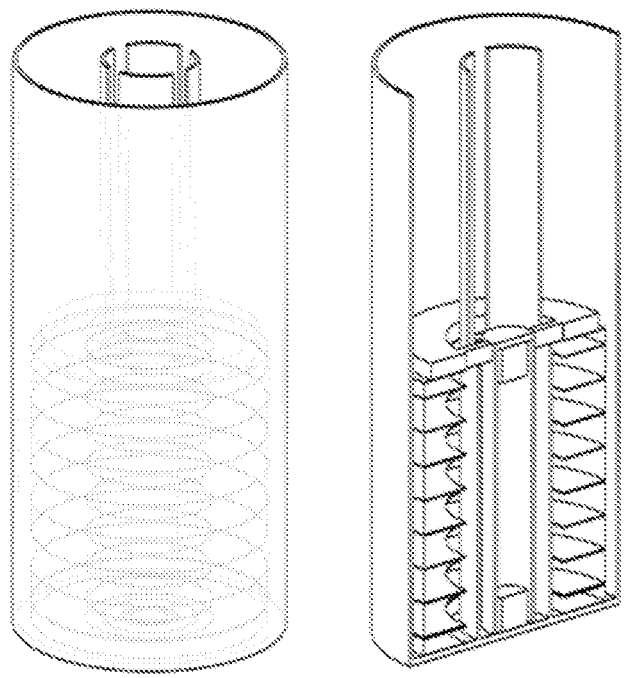
FIG. 3 is a schematic diagram of an axial vibration monitoring working mode of a device for real-time monitoring and early warning of a bridge based on foldable triboelectric nanogenerators.

As shown in FIG. 3, when the internal unit 2 is subjected to axial vibration, the internal unit 2 slides downwards along the axis through the cover plate 201 to squeeze the flexible multilayer triboelectric nanogenerators 204, such that the upper surface and the lower surface with opposite polarities are subjected to contact separation motion to generate a voltage signal. When the axial vibration disappears, the repulsive force generated by the upper magnet 202 and the lower magnet 303 resets the internal unit 2.

Figure 4:
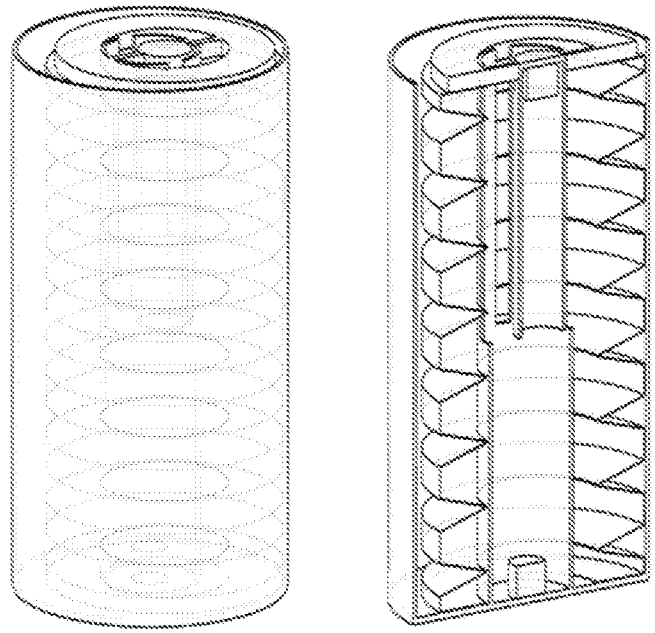
FIG. 4 is a schematic diagram of a radial vibration monitoring working mode of a device for real-time monitoring and early warning of a bridge based on foldable triboelectric nanogenerators.

As shown in FIG. 4, when the internal unit 2 is subjected to radial vibration, the cover plate 201 shakes left and right along the radial direction, such that the side wall of the flexible multilayer triboelectric nanogenerators 204 and the device sidewall 302 are subjected to contact separation motion due to the opposite material polarities to generate a voltage signal.

Figure 5:
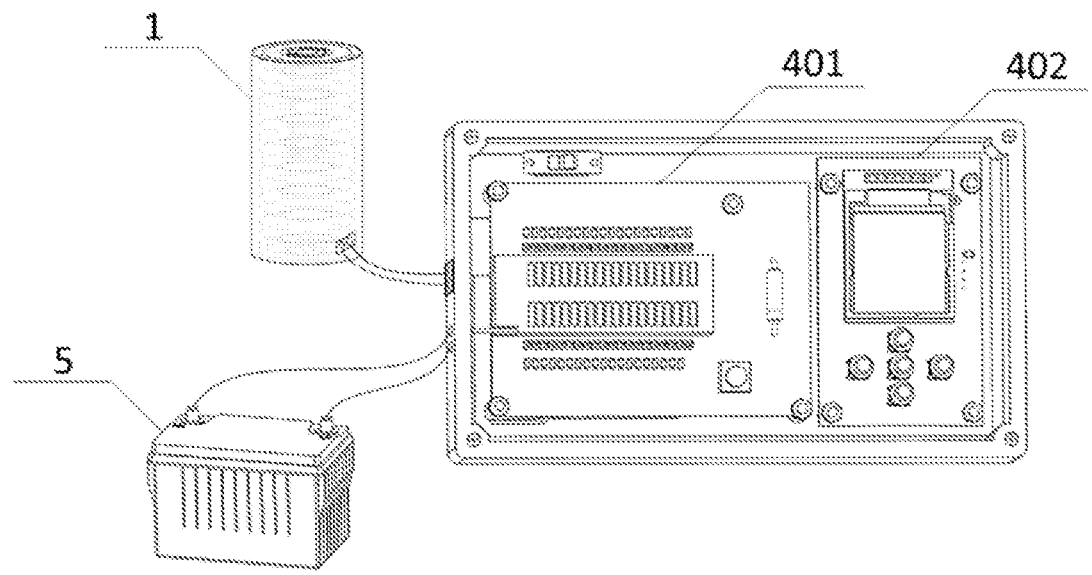
FIG. 5 is a schematic diagram of a working principle of a device for real-time monitoring and early warning of a bridge based on foldable triboelectric nanogenerators.
Figure 6:
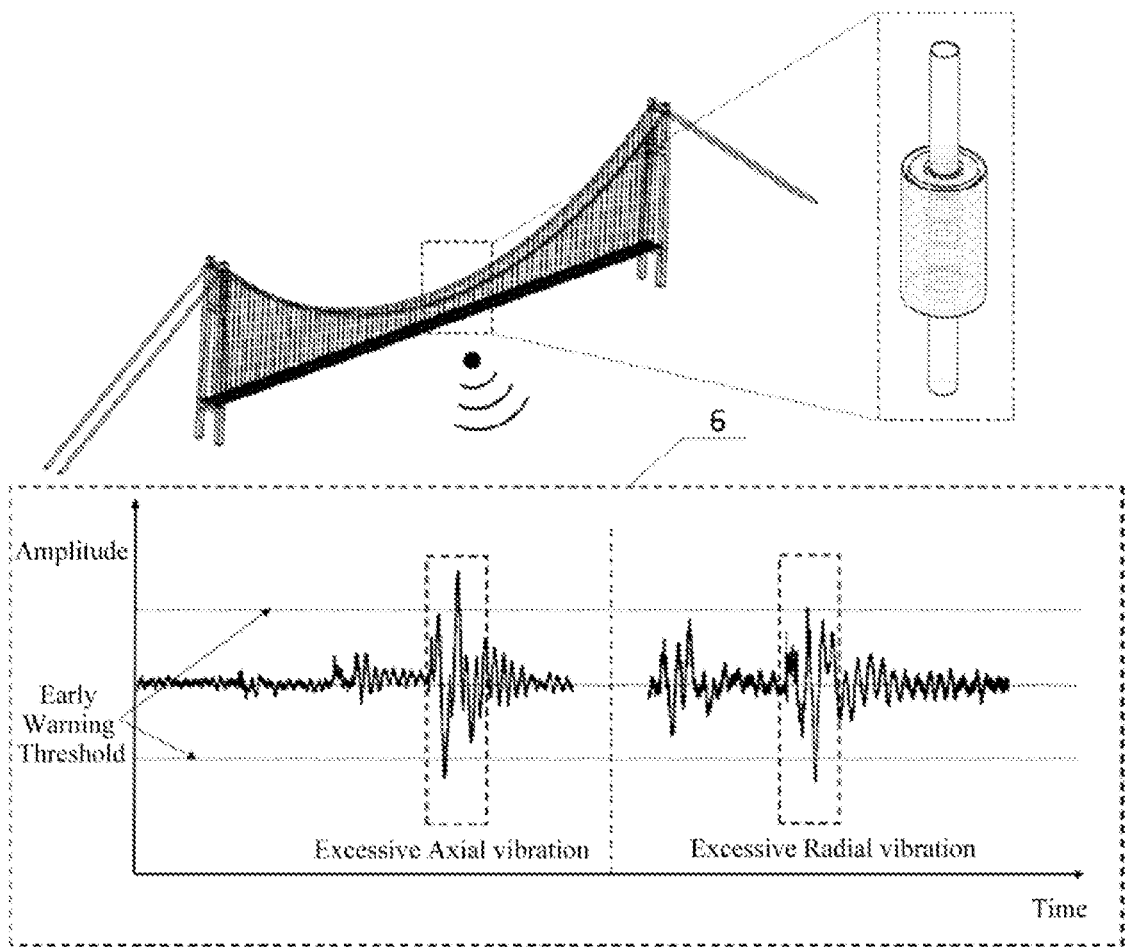
FIG. 6 is a schematic diagram of an application scenario of a device for real-time monitoring and early warning of a bridge based on foldable triboelectric nanogenerators.

As shown in FIG. 5, the data acquisition and transmission module 4 includes a data acquisition chip 401 and a data transmission chip 402. The data acquisition chip 401 is configured to collect the voltage signals generated by the flexible multilayer triboelectric nanogenerators 204 in two different directions. The data transmission chip 402 transmits the voltage signals collected by the data acquisition chip 4 to the data processing and early warning module 6 through a wireless and real-time transmission for analysis and early warning.

The device of the present disclosure further includes an energy supply module 5 configured to supply power for the data acquisition chip 401 and the data transmission chip 402, to ensure the data acquisition chip and the data transmission chip to operate normally and stably.

The data processing and early warning module 6 receives the voltage signal transmitted by the data transmission chip 402 in real time. The voltage signal has a magnitude positively correlated with the vibration amplitude of the bridge. When the voltage signal is higher than the provided voltage threshold, it is determined that the bridge vibration is excessive, and results are transmitted to the relevant departments to avoid safety accidents.

FIGS. 2-6 specifically explain the working principle of the device for real-time monitoring and early warning of a bridge based on foldable triboelectric nanogenerators during bridge vibration monitoring. When a vehicle runs on a bridge, an internal unit 2 is subjected to axial vibration, and the internal unit 2 slides downwards along the axis through the cover plate 201, squeezing the flexible multilayer triboelectric nanogenerators 204, such that the upper surface and the lower surface with opposite polarities are subjected to contact separation motion to generate a voltage signal. When the axial vibration disappears, the repulsive force generated by the upper magnet 202 and the lower magnet 303 resets the internal unit 2. When the bridge receives wind force and other effects, the internal unit 2 is subjected to radial vibration, and the cover plate 201 shakes left and right along the radial direction, such that the side wall of the flexible multilayer triboelectric nanogenerators 204 and the device sidewall 302 are subjected to contact separation motion due to the opposite material polarities to generate a voltage signal. The data acquisition and transmission module 4 adopts a multi-channel data acquisition mode for collecting the voltage signals in two different directions generated by the flexible multilayer triboelectric nanogenerators 204. The data transmission chip 402 wirelessly and real-time transmits collected voltage signals to the data processing and early warning module 6. The data processing and early warning module 6 receives the voltage signals transmitted by the data transmission chip 402 in real time, and the voltage signal has a magnitude positively correlated with the vibration amplitude of the bridge. When the voltage signal exceeds the preset voltage threshold, the device according to the present disclosure may determine that the bridge vibration is excessive and transmit the information to the relevant departments. The relevant departments shall take measures immediately to avoid safety accidents. The energy supply module 5 can supply power for the data acquisition chip 401 and the data transmission chip 402 to ensure the data acquisition chip and the data transmission chip to operate normally and stably.

Finally, it should be noted that the above embodiments are only used to illustrate the technical solutions of the present disclosure, but not to be limitation thereof. Although the present disclosure has been described in detail with reference to the foregoing embodiments, those of ordinary skill in the art should understand that the technical solutions described in the foregoing embodiments can still be modified, or some or all of the technical features can be equivalently replaced. These modifications or substitutions do not make the essence of the corresponding technical solutions depart from the scope of the technical solutions of the embodiments of the present disclosure.

What is claimed is:

1. A device for real-time monitoring and early warning of a bridge based on foldable triboelectric nanogenerators, comprising:
    a signal generator comprising an internal unit and an external unit, wherein the internal unit is inserted into the external unit,
    a data acquisition and transmission module, and
    a data processing and early warning module,
    wherein the signal generator, the data acquisition and transmission module, and the data processing and early warning module are sequentially connected,
    wherein the external unit comprises:
    a device sidewall,
    a lower sleeve fixed in the device sidewall, and
    a lower magnet fixed at a bottom of the lower sleeve,
    wherein a plurality of vertical grooves are provided at an upper section of the lower sleeve, and
    wherein the internal unit comprises:
    a cover plate,
    an upper magnet,
    an upper sleeve, and
    a flexible multilayer triboelectric nanogenerators, and
    wherein the flexible multilayer triboelectric nanogenerators is inserted into a gap between the lower sleeve and the device sidewall, the cover plate is arranged at an upper end of the flexible multilayer triboelectric nanogenerators, and the upper sleeve is fixed at a middle position of the flexible multilayer triboelectric nanogenerators through a bracket, the bracket is matched with the plurality of grooves at the upper section of the lower sleeve, the upper sleeve is inserted into the lower sleeve to form a sliding connection; and the upper magnet is fixed at a bottom of the upper sleeve, wherein two materials with opposite polarities are provided between an upper surface and a lower surface of adjacent layers of the flexible multilayer triboelectric nanogenerators, and two materials with opposite polarities are provided between a side wall of the flexible multilayer triboelectric nanogenerators and the device sidewall, wherein the flexible multilayer triboelectric nanogenerators comprises a multilayer flexible structure that is elastic and extendible, and wherein two materials used in the flexible multilayer triboelectric nanogenerators are copper and nylon, and the flexible multilayer triboelectric nanogenerators is designed to be multilayer and extendible,
    wherein when the internal unit is subjected to axial vibration, the internal unit slides downwards along an axis through the cover plate to squeeze the flexible multilayer triboelectric nanogenerators, in such a manner that an upper surface and an lower surface of the flexible multilayer triboelectric nanogenerators with opposite polarities are subjected to contact separation motion to generate a voltage signal, and
    wherein when the internal unit is subjected to radial vibration, the cover plate shakes left and right along a radial direction, in such a manner that a side wall of the flexible multilayer triboelectric nanogenerators and the device sidewall are subjected to contact separation motion due to opposite material polarities to generate a voltage signal.

2. The device for real-time monitoring and early warning of the bridge based on foldable triboelectric nanogenerators according to claim 1, wherein when the axial vibration disappears, a repulsive force generated by the upper magnet and the lower magnet at levels that stabilize the matched polarities of the foldable triboelectric nanogenerator resets the internal unit.

3. The device for real-time monitoring and early warning of the bridge based on foldable triboelectric nanogenerators according to claim 1, wherein the data acquisition and transmission module comprises:
   a data acquisition chip configured to collect voltage signals generated by the flexible multilayer triboelectric nanogenerators in two different directions, and
   a data transmission chip configured to transmit the voltage signals collected by the data acquisition chip to the data processing and early warning module through a wireless real-time transmission for analysis and early warning.

4. The device for real-time monitoring and early warning of the bridge based on foldable triboelectric nanogenerators according to claim 1, further comprising an energy supply module for supplying power for the data acquisition chip and the data transmission chip, to ensure the data acquisition chip and the data transmission chip to operate.

5. The device for real-time monitoring and early warning the bridge based on foldable triboelectric nanogenerators according to claim 1, wherein the data processing and early warning module receives a voltage signal transmitted by a data transmission chip in real time, the voltage signal has a magnitude positively correlated with a vibration amplitude of the bridge, and when the voltage signal is higher than a preset voltage threshold, it is determined that the vibration amplitude of the bridge is excessive, and results are transmitted to a relevant department to avoid safety accidents.

* * * * *